United States Patent [19]
Ono et al.

[11] Patent Number: 5,235,466
[45] Date of Patent: Aug. 10, 1993

[54] ZOOM LENS

[75] Inventors: Shusuke Ono, Takatsuki; Hisayuki Ii, Katano, both of Japan

[73] Assignee: Matsushita Electric Industrial Co., Ltd., Kadoma, Japan

[21] Appl. No.: 942,826

[22] Filed: Sep. 10, 1992

[30] Foreign Application Priority Data

Sep. 12, 1991 [JP] Japan .................... 3-232840

[51] Int. Cl.$^5$ .................... G02B 15/14; G02B 13/18; G02B 9/34; H04N 5/225
[52] U.S. Cl. .................... 359/684; 359/687; 359/715; 359/774; 358/225
[58] Field of Search ................ 358/225; 359/676, 684, 359/708, 715, 774, 686, 687

[56] References Cited

U.S. PATENT DOCUMENTS

| | | | |
|---|---|---|---|
| 4,666,257 | 5/1987 | Tanaka et al. | 359/708 |
| 4,802,747 | 2/1989 | Horiuchi | 359/687 |
| 4,818,083 | 4/1989 | Mihara | 359/687 |
| 4,859,042 | 8/1989 | Tanaka | 359/684 |
| 5,100,223 | 3/1992 | Ono et al. | 359/683 |

FOREIGN PATENT DOCUMENTS 0405856 6/1990 European Pat. Off. .
0012621 1/1991 Japan .................... 359/687

OTHER PUBLICATIONS

Tanaka, K. "A Novel Configuration of Zoom Lens" Optik vol. 73, No. 4 (1986) pp. 157-159.

Primary Examiner—Rodney B. Bovernick
Assistant Examiner—David R. Parsons
Attorney, Agent, or Firm—Wenderoth, Lind & Ponack

[57] ABSTRACT

A zoom lens comprises sequentially from a side of an object: a fixed first lens group constituted by a convex lens, a double convex lens and a meniscus convex lens; a movable second lens group constituted by a meniscus convex lens, a double concave lens and a convex lens; a fixed third lens group constituted by a single lens having at least one aspherical surface; and a movable fourth lens group constituted by a concave lens and two convex lenses at least one of which has at least one aspherical surface.

5 Claims, 11 Drawing Sheets

ZOOM LENS

BACKGROUND OF THE INVENTION

The present invention relates to a high-performance aspherical zoom lens for use in a 3-CCD (charge coupled device) type video camera or the like, which has a high zoom ratio of about 10 and a long back focal distance.

In response to recent demand for excellent operational efficiency, good mobility and high image quality in video cameras, high-resolution imaging devices as compact as ½" are becoming a mainstream of imaging devices. Meanwhile, in this connection, high-performance and high-magnification zoom lenses which are large in aperture ratio, compact in size and light in weight are in strong demand. Furthermore, due to a big demand for reduction of production cost of zoom lenses, high-performance and high-magnification zoom lenses in which the number of lens components is reduced are in urgent need.

However, in known high-magnification zoom lenses, not only diameters and an overall length of lenses become large but a large number of the lenses are required to be used for performing more strict aberration correction. As a result, the known high-magnification zoom lenses become larger, heavier and more expensive and therefore, have not been suitable for use in video cameras for home use. Therefore, known compact and light zoom lenses having an F-number of about 1.4 to 1.6 and including 10 lenses or so have a zoom ratio of about 6.

Hereinbelow, one example of a prior art zoom lens for use in a video camera disclosed in, for example, U.S. Pat. No. 5,100,223 is described with reference to FIG. 2. The prior art zoom lens includes a first lens group 21 acting as an image forming portion, a second lens group 22 acting as a magnification changing portion, a third lens group 23 acting as a light converging portion, a fourth lens group 24 acting a focusing portion and a glass plate 25 optically equivalent to a quartz crystal filter and a face plate of an imaging device. Reference numeral 26 denotes an image surface.

Figure 2:
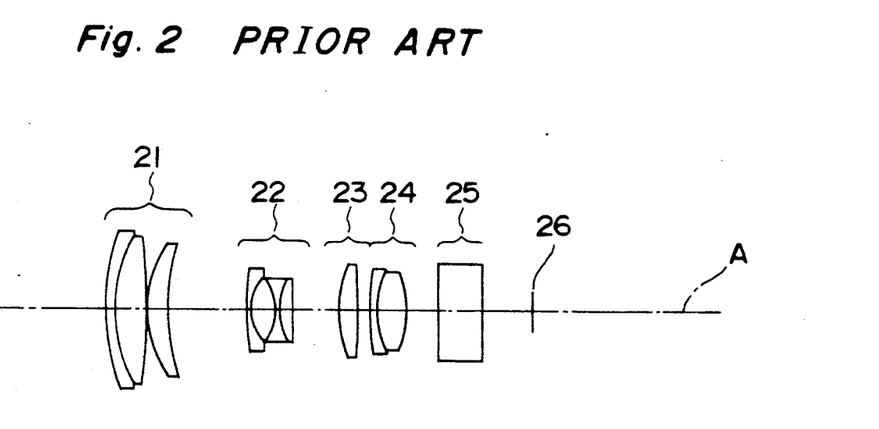
FIG. 2 is a schematic sectional view of a prior art aspherical zoom lens (already referred to)

Operation of the prior art zoom lens of the above described arrangement is described, hereinbelow. The first lens group 21 is fixed relative to the image surface 26 and has an image forming function, while the second lens group 22 is movable on an optical axis A so as to change magnification such that a focal length of an entire system is changed. The third lens group 23 is fixed relative to the image surface 26 and has a function of converging divergent light produced by the second lens group 22. On the other hand, the fourth lens group 24 is movable on the optical axis A and has a focusing function Variations in position of the image surface 26 due to travel of the second lens group 22 at the time of zooming are eliminated by displacing the fourth lens group 24 such that the image surface 26 is fixed at a predetermined position.

However, in the prior art zoom lens of the above described arrangement, if the zoom ratio is set to 10 or so, it becomes difficult to perform aberration correction over an entire zoom range and an entire shooting distance, so that high image quality cannot be achieved. Furthermore, the prior art zoom lens has such a drawback that since the back focal distance is short, a color separation optical system required for producing a three-CCD type video camera cannot be inserted between the lens system and the image surface 26.

SUMMARY OF THE INVENTION

Accordingly, an essential object of the present invention is to provide, with a view to eliminating the inconveniences of the prior art, a high-performance aspherical zoom lens of simple construction having a zoom ratio of about 10 and long back focal distance enabling insertion of a color separation optical system, in which new lens types and optimum aspherical contours are employed and a video camera including the aspherical zoom lens.

In order to accomplish this object of the present invention, an aspherical zoom lens according to the present invention comprises sequentially from a side of an object: a first lens group which has a positive refracting power and is fixed relative to an image surface; a second lens group which has a negative refracting power and is movable on an optical axis of the aspherical zoom lens so as to have a magnification changing function; a third lens group which has a positive refracting power and is fixed relative to the image surface so as to have a light converging function; and a fourth lens group which has a positive refracting power and is movable on the optical axis such that the image surface displaceable in response to travel of the second lens group and movement of the object is fixed at a position spaced a predetermined distance from a reference surface; wherein a relatively large air space is provided between the third and fourth lens groups; wherein when viewed sequentially from the side of the object, the first lens group is sequentially constituted by a convex lens, a double convex lens and a meniscus convex lens, the second lens group is sequentially constituted by a meniscus convex lens, a double concave lens and a convex lens, the third lens group is constituted by a single lens having at least one aspherical surface and the fourth lens group is sequentially constituted by a concave lens and first and second convex lenses at least one of which has at least one aspherical surface.

The lenses of the first to fourth lens groups have lens types and surface contours preferable for excellent aberration performance. To this end, it is desirable that the lens of the third lens group has a convex surface confronting the object. Furthermore, in the fourth lens group, it is desirable that the concave lens has a concave surface confronting the object and the second convex lens has a convex surface confronting the image surface.

More specifically, the aspherical zoom lens of the present invention should desirably satisfy the following conditions (1) to (8):

(1) $3.0 < f1/fW < 8.0$
(2) $0.5 < |f2|/fW < 1.6$
(3) $2.0 < f3/fW < 7.0$
(4) $2.0 < f4/fW < 5.0$
(5) $0.02 < d12/f4 < 1.0$
(6) $0.3 < r11/f3 < 1.5$
(7) $0.3 < |r13|/f4 < 2.0$
(8) $0.3 < |r18|/f4 < 1.5$ where character fW denotes a focal length of the aspherical zoom lens at a wide angle end, character $fi$ ($i=1–4$) denotes a focal length of an i-th lens group, character d12 denotes the air space between the third and fourth lens groups, character r11 denotes a radius of curvature of one surface of the lens of the third lens group, which surface confronts the object, character r13 denotes a radius of curvature of one surface of the concave lens of the fourth lens group, which surface confronts the object and character r18 denotes a radius of curvature of one surface of the second convex lens, which surface confronts the image surface.

Meanwhile, in order to accomplish the object of the present invention, a video camera according to the present invention includes at least the above mentioned aspherical zoom lens of..the present invention, a color separation optical system, three imaging devices, a signal processing circuit and a viewfinder.

By the above described arrangement of the present invention, the drawbacks inherent in the prior art can be eliminated. Namely, when viewed sequentially from the side of the object, the first lens group is constituted by the convex lens, the double convex lens and the meniscus convex lens, the second lens group is constituted by the meniscus convex lens, the double concave lens and the convex lens, the third lens group is constituted by the single aspherical lens having the convex surface confronting the object and having the positive refracting power and the fourth lens group is constituted by the concave lens having the concave surface confronting the object, the first convex lens and the second convex lens having the convex surface confronting the image surface such that at least one of the concave lens and the first and second convex lenses has at least one aspherical surface. As a result, the aspherical zoom lens having a zoom ratio of about 10 and a long back focal distance can be obtained in simple construction.

Meanwhile, when the above conditions (1) to (8) are satisfied, the high-performance aspherical zoom lens of simple construction in which aberrations are corrected excellently can be obtained.

Furthermore, by using the aspherical zoom lens of the present invention, a compact and light video camera of 3-CCD type having high magnification and high image quality can be obtained.

In accordance with the present inventio as is clear from the foregoing, the high-performance aspherical zoom lens having an F-number of about 1.6 and a zoom ratio of about 10 can be obtained by as small as 10 lens components and the compact, light and high-performance video camera of 3-CCD type can be obtained by using this aspherical zoom lens.

BRIEF DESCRIPTION OF THE DRAWINGS

This object and features of the present invention will become apparent from the following description taken in conjunction with the preferred embodiments thereof with reference to the accompanying drawings, in which.

In the diagrams of spherical aberration, the solid line, the dotted line and the broken line illustrate d-line, F-line and C-line, respectively, while in the diagrams of astigmatism, the solid line and the dotted line illustrate sagittal image surface and meridional image surface, respectively.

Before the description of the present invention proceeds, it is to be noted that like parts are designated by like reference numerals throughout several views of the accompanying drawings.

DETAILED DESCRIPTION OF THE INVENTION

Figure 1:
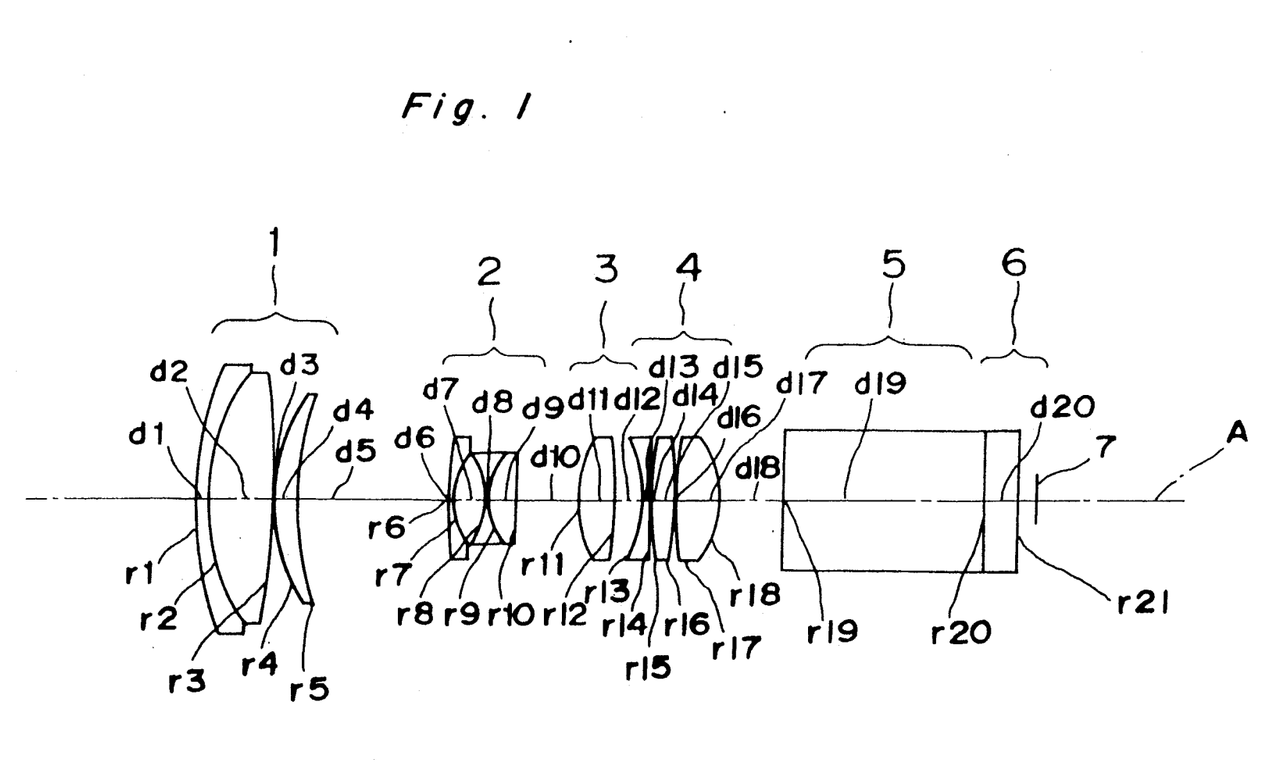
FIG. 1 is a schematic sectional view of an aspherical zoom lens according to a first embodiment of the present invention.

Referring now to the drawings, there is shown in FIG. 1, an aspherical zoom lens according to a first embodiment of the present invention. The aspherical zoom lens includes a first lens group 1 having a positive refracting power, a second lens group 2 having a negative refracting power, a third lens group 3 constituted by an aspherical lens having a positive refracting power, a fourth lens group having a positive refracting power, a flat glass plate 5 optically equivalent to a color separation optical system and a flat glass plate 6 optically equivalent to a quartz crystal filter and a face plate of an imaging device. Reference numeral 7 denotes an image surface.

The first lens group 1 has an image forming function and is fixed relative to the image surface 7. The second lens group 2 is movable on an optical axis A so as to have a magnification changing function. The third lens group 3 has a light converging function and is fixed relative to the image surface 7. The fourth lens group 4 is movable on the optical axis A so as to make focusing adjustments and includes an aspherical lens.

A relatively large air space d12 is provided between the third and fourth lens groups 3 and 4. When viewed sequentially from a side of an object, the first lens group 1 includes a cemented lens and a meniscus lens having a positive refracting power, while the second lens group 2 includes a meniscus lens having a negative refracting power and a cemented lens. On the other hand, the third lens group 3 is constituted by a single aspherical lens having a convex surface confronting the object. Meanwhile, the fourth lens group 4 is sequentially constituted, when viewed from the side of the object, by a concave lens having a concave surface confronting the object, a first convex lens and a second convex lens having a convex surface confronting the image surface 7 and at least one of the concave lens and the first and second convex lenses has at least one aspherical surface.

It is preferable that the zoom lens should satisfy the following conditions (1) to (8).

(1) $3.0 < f1/fW < 8.0$
(2) $0.5 < f2/fW < 1.6$
(3) $2.0 < f3/fW < 7.0$
(4) $2.0 < f4/fW < 5.0$
(5) $0.02 < d12/f4 < 1.0$
(6) $0.3 < r11/f3 < 1.5$
(7) $0.3 < |r13|/f4 < 2.0$
(8) $0.3 < |r18|/f4 < 1.5$

In the above conditions (1) to (8), character fW denotes a focal length at a wide angle end, character fi (i=1-4) denotes a focal length of an i-th lens group, character d12 denotes the air space between the third and fourth lens groups 3 and 4, character r11 denotes a radius of curvature of the convex surface of the aspherical lens constituting the third lens group 3, which convex surface confronts the object, character r13 denotes a radius of curvature of a surface of the concave lens of the fourth lens group 4, which surface confronts the object and character r18 denotes a radius of curvature of the convex surface of the second convex lens adjacent to the image surface 7, which convex surface confronts the image surface 7.

In order to make the zoom lens compact, it is necessary to increase refracting power of each of the first to fourth lens groups 1 to 4. The above conditions (1) to (4) specify refracting power of each of the first to fourth lens groups 1 to 4. Thus, when the conditions (1) to (4) are satisfied, large refracting power is given to each of the first to fourth lens groups 1 to 4 so as to make the zoom lens compact and excellent aberration performance can be obtained by designing types, surface contours, etc. of the lenses of each of the first to fourth lens groups 1 to 4 in optimum manner.

The fact that the third lens group 3 is constituted by the aspherical lens having the convex surface confronting the object is essential for the requirements that the third lens group 3 is constituted by a single lens and various aberrations of large aperture having an F-number of about 1.6 are corrected. Especially, the aspherical surface of the lens of the third lens group 3 exercises a great effect on correction of spherical aberration.

The fact that the fourth lens group 4 is constituted by one concave lens and two convex lenses and at least one of the concave lens and the two convex lenses has at least one aspherical surface is essential for the requirements that the zoom lens has a long back focal distance and chromatic aberration on and off the optical axis A and monochromatic aberration off the optical axis A are corrected.

Hereinbelow, the conditions (1) to (8) are described in more detail. The condition (1) relates to refracting power of the first lens group 1. When the ratio (f1/fW) of the condition (1) falls out of the lower limit of 3.0, refracting power of the first lens group 1 becomes too large, so that it becomes difficult to correct spherical aberration at the telephoto side. On the other hand, when the ratio of the condition (1) exceeds the upper limit of 8.0, the lens length becomes large and thus, it is impossible to make the zoom lens compact.

The condition (2) relates to refracting power of the second lens group 2. When the ratio ($|f2|/fW$) of the condition (2) falls out of the lower limit of 0.5, the zoom lens can be made compact but Petzval sum of the entire system becomes negative greatly, so that curvature of field cannot be corrected by merely selecting glass material to be used. On the other hand, when the ratio of the condition (2) exceeds the upper limit of 1.6, aberration correction can be performed easily but the magnification changing system becomes large and thus, the entire system cannot be made compact.

The condition (3) relates to refracting power of the third lens group 3. When the ratio (f3/fW) of the condition (3) falls out of the lower limit of 2.0, refracting power of the third lens group 3 becomes too large. As a result, the back focal distance is not long enough to insert the color separation optical system and it becomes difficult to correct spherical aberration. On the other hand, when the ratio of the condition (3) exceeds the upper limit of 7.0, combination of the first, second and third lens groups 1, 2 and 3 becomes a divergent system, so that diameter of the lenses of the fourth lens group 4 disposed rearwards of the divergent system cannot be made small and Petzval sum of the entire system cannot be made small.

The condition (4) relates to refracting power of the fourth lens group 4. When the ratio (f4/fW) of the condition (4) falls out of the lower limit of 2.0, an image containing range becomes narrow. Thus, in order to obtain a desired image containing range, diameter of the lenses of the first lens group 1 should be increased and thus, the zoom lens cannot be made compact and light. On the contrary, when the ratio of the condition (4) exceeds the easily but travel stroke of the fourth lens group 4 at the time of short-distance shooting becomes large. As a result, not only the entire system cannot be made compact but it becomes difficult to correct imbalance between aberration off the optical axis A at the time of short-distance shooting and that at the time of long-distance shooting.

The condition (5) relates to the air space between the third and fourth lens groups 3 and 4. When the ratio (d12/f4) of the condition (5) falls out of the lower limit of 0.02, height of light ray off the optical axis A becomes small, so that it becomes difficult to correct chromatic aberration off the optical axis A by merely selecting glass material to be used. Meanwhile, since travel stroke of the fourth lens group 4 at the time of short-distance shooting is restricted, a sufficiently short close-up distance cannot be obtained. On the other hand, when the ratio of the condition (5) exceeds the upper limit of 1.0, it is difficult to make the entire system compact. Meanwhile, when sufficiently large quantity of light is ensured around an image plane, diameter of the lenses of the fourth lens group 4 cannot be reduced.

The condition (6) relates to radius of curvature of one surface of the aspherical lens of the third lens group 3, which surface confronts the object. When an aspherical surface is provided on one surface of the aspherical lens confronting the object or the other surface of the aspherical lens confronting the image surface 7 or both of the surfaces of the aspherical lens and contour of the aspherical surface is designed in optimum manner, various aberrations can be corrected sufficiently in spite of the fact that the third lens group 3 is constituted by a single lens. However, if the ratio (r11/f3) of the condition (6) falls out of the lower limit of 0.3, it becomes difficult to correct spherical aberration. On the contrary, if the ratio of the condition (6) exceeds the upper limit of 1.5, it becomes difficult to correct comatic aberration of light ray off the optical axis A below the principal light ray.

The condition (7) relates to radius of curvature of the concave surface of the concave lens of the fourth lens group 4, which concave surface confronts the object. When the ratio ($|r13|/f4$) of the condition (7) falls out of the lower limit of 0.3, incident angle relative to the concave surface of the concave lens becomes large and thus, it becomes difficult to correct comatic aberration of light ray off the optical axis A below the principal light ray. On the other hand, when the ratio of the condition (7) exceeds the upper limit of 2.0, refracting power of the concave lens cannot be increased and thus, a sufficiently long back focal distance cannot be obtained.

The condition (8) relates to radius of curvature of one surface of the second convex lens of the fourth lens group 4, which surface confronts the image surface 7. When the ratio ($|r18|/f4$) falls out of the lower limit of 0.3, exit angle from the one surface of the second convex lens becomes large, so that it becomes difficult to correct comatic aberration of light ray off the optical axis A over the principal light ray and curvature of field at a side of wide angle. On the other hand, when the ratio of the condition (8) exceeds the upper limit of 1.5, refracting power of the first convex of the fourth lens group 4 lens becomes large and thus, a sufficiently long back focal distance cannot be obtained.

In the zoom lens according to the first embodiment of the present invention, one concrete example satisfying the conditions (1) to (8) is shown in Table 1 below. In Table 1, character r denotes radius of curvature of a surface of each of the lenses of the zoom lens, character d denotes thickness of each of the lenses of the zoom lens or air space between the lenses, character n denotes refractive index for d-line of each of the lenses of the zoom lens, character v denotes Abbe number for d-line of each of the lenses of the zoom lens, character f denotes focal length at the wide angle end and a telephoto end of the zoom lens and character F/No. denotes F-number at the wide angle end and the telephoto end of the zoom lens.

TABLE 1

$f = 6.140–59.387$
$F/No. = 1.66–2.50$

| Lens group | i of i-th surface | r | d | n | v |
|---|---|---|---|---|---|
| 1 | 1 | 39.204 | 1.00 | 1.80518 | 25.4 |
|   | 2 | 21.203 | 6.60 | 1.58913 | 61.2 |
|   | 3 | −80.781 | 0.15 |  |  |
|   | 4 | 18.777 | 2.20 | 1.60311 | 60.7 |
|   | 5 | 31.043 | Variable |  |  |
| 2 | 6 | 31.043 | 0.70 | 1.77250 | 49.6 |
|   | 7 | 7.732 | 2.80 |  |  |
|   | 8 | −9.331 | 0.70 | 1.77250 | 49.6 |
|   | 9 | 7.829 | 2.80 | 1.84666 | 23.9 |
|   | 10 | −641.470 | Variable |  |  |
| 3 | 11 | 18.662 | 3.00 | 1.60602 | 57.4 |
|   | 12 | −63.686 | Variable |  |  |
| 4 | 13 | −15.127 | 0.70 | 1.80518 | 25.4 |
|   | 14 | −348.242 | 0.15 |  |  |
|   | 15 | 47.924 | 2.40 | 1.51565 | 63.9 |
|   | 16 | −18.252 | 0.15 |  |  |
|   | 17 | 38.878 | 3.60 | 1.48749 | 70.4 |
|   | 18 | −11.603 | Variable |  |  |
| 5 | 19 | ∞ | 20.00 | 1.58913 | 61.2 |
| 6 | 20 | ∞ | 3.40 | 1.51633 | 64.1 |
|   | 21 | ∞ | — |  |  |

Meanwhile, contour of the aspherical surface is defined by the following equation.

$$Z = C \cdot Y^2 / \{1 + \sqrt{1 - (1 + K) \cdot C^2 \cdot Y^2}\} + D \cdot Y^4 + E \cdot Y^6 + F \cdot Y^8 + G \cdot Y^{10} + H \cdot Y^{12} + I \cdot Y^{14}$$

In the above equation, character Z denotes a distance between a vertex of the aspherical surface and a point on the aspherical surface when height of the point from the optical axis A is expressed by Y, character C denotes a curvature of the vertex of the aspherical surface, character K denotes a conical constant and characteris D to I denote aspherical coefficients.

In Table 1, the 11th, 12th, 15th and 16th surfaces are aspherical and the conical constant K and the aspherical coefficients D to I of these surfaces are shown in Tables 2(a) and 2(b) below.

TABLE 2(a)

|   | 11th surface | 12th surface |
|---|---|---|
| K | −1.82753E − 1 | 2.50365E + 1 |
| D | −7.71224E − 7 | 4.37245E − 5 |
| E | −4.53823E − 7 | −6.89727E − 7 |
| F | −7.59748E − 9 | −5.99825E − 9 |
| G | −1.10345E − 9 | −9.23199E − 10 |
| H | −3.11441E − 12 | −1.51937E − 11 |
| I | 2.89657E − 13 | 4.96766E − 13 |

TABLE 2(b)

|   | 15th surface | 16th surface |
|---|---|---|
| K | −4.10808E + 1 | −3.94400E + 0 |
| D | 4.56805E − 5 | 1.20599E − 4 |
| E | 2.86433E − 7 | 2.14525E − 6 |
| F | −1.76905E − 8 | −1.15852E − 9 |
| G | −1.57800E − 10 | −8.00072E − 10 |
| H | −1.61784E − 11 | 5.30929E − 12 |
| I | 4.47078E − 13 | 1.27422E − 13 |

Then, as examples of the air space variable by zooming, values of the air space obtained at the time when an object point is disposed at infinite distance from the zoom lens, values of the air space obtained at the time when the object point is disposed at a distance of 2m from the surface r1 of the first lens group 1 and values of the air space obtained at the time when the object point is disposed at a distance of 1m from the surface r1 of the first lens group 1 are, respectively, shown in Tables 3, 4 and 5 below.

TABLE 3

|  | Wide angle | Standard | Telephoto |
|---|---|---|---|
| f | 6.141 | 28.663 | 60.411 |
| d5 | 1.000 | 14.420 | 18.699 |
| d10 | 20.353 | 6.933 | 2.654 |
| d12 | 8.217 | 3.528 | 8.217 |
| d18 | 2.000 | 6.689 | 2.000 |

TABLE 4

|  | Wide angle | Standard | Telephoto |
|---|---|---|---|
| f | 6.140 | 31.289 | 59.387 |
| d5 | 1.000 | 14.960 | 18.699 |
| d10 | 20.353 | 6.393 | 2.654 |
| d12 | 8.197 | 3.095 | 6.484 |
| d18 | 2.019 | 7.121 | 3.733 |

TABLE 5

|  | Wide angle | Standard | Telephoto |
|---|---|---|---|
| f | 6.139 | 34.304 | 58.533 |
| d5 | 1.000 | 15.520 | 18.699 |
| d10 | 20.353 | 5.833 | 2.654 |
| d12 | 8.178 | 2.614 | 4.990 |
| d18 | 2.039 | 7.603 | 5.226 |

In Tables 3 to 5, the indication "Standard" means a standard position representing a zoom position where the fourth lens group 4 comes closest to the third lens group 3 for each position of the object point.

Figure 3:
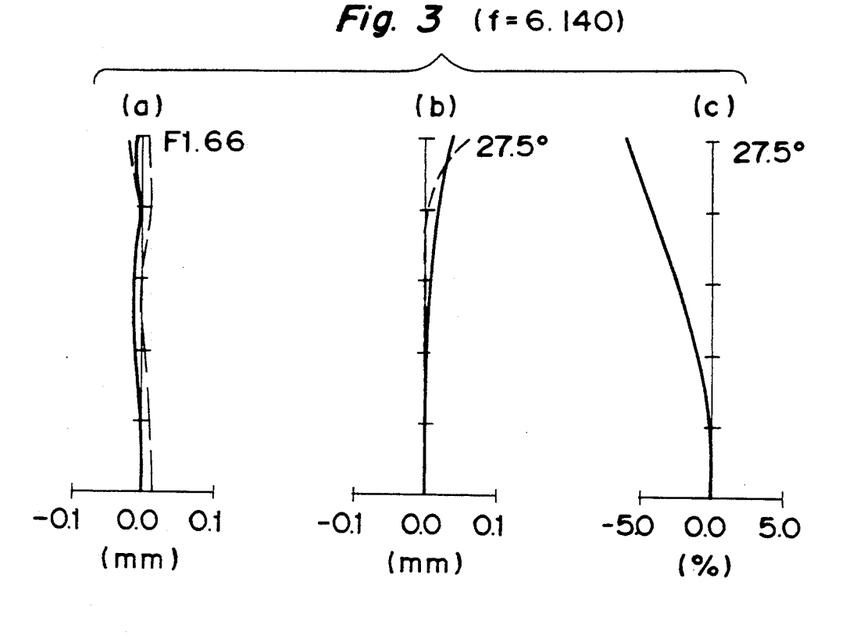
FIGS. 3(a), 3(b) and 3(c) are diagrams showing spherical aberration, astigmatism and distortion at a wide angle end in the aspherical zoom lens of FIG. 1, respectively.
Figure 4:
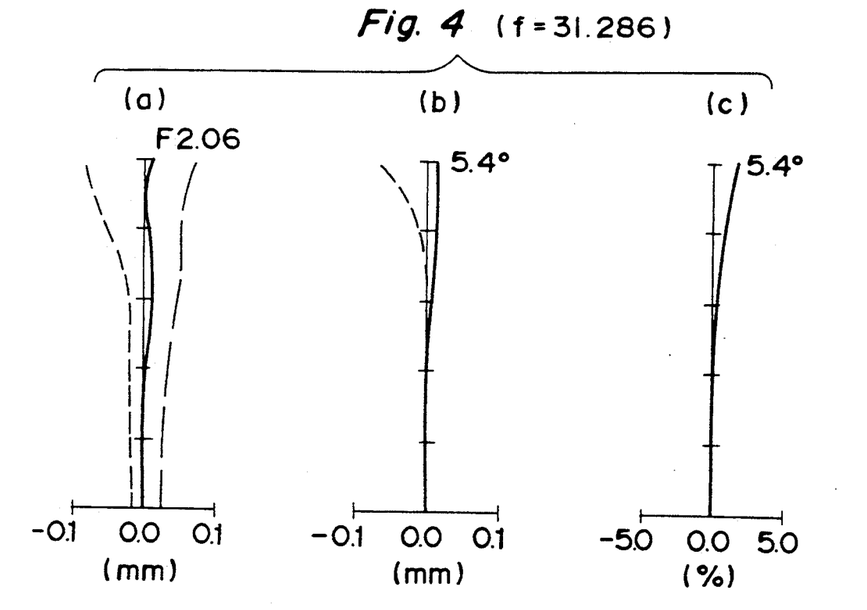
FIGS. 4(a), 4(b) and 4(c) are diagrams showing spherical aberration, astigmatism and distortion at a standard position in the aspherical zoom lens of FIG. 1, respectively.
Figure 5:
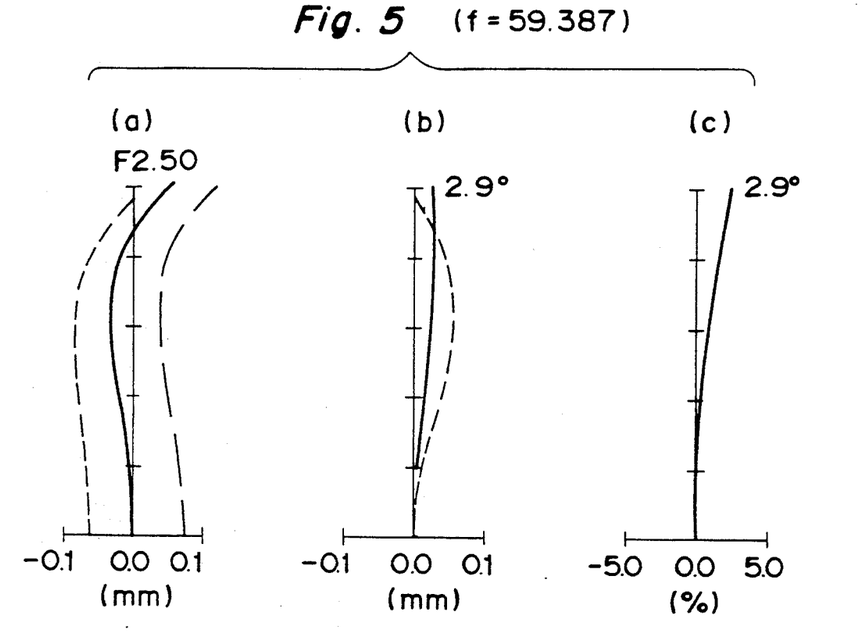
FIGS. 5(a), 5(b) and 5(c) are diagrams showing spherical aberration, astigmatism and distortion at a telephoto end in the aspherical zoom lens of FIG. 1, respectively.

FIGS. 3, 4 and 5 show aberrations at the wide angle end, the standard position and the telephoto end of the aspherical zoom lens shown in Table 1, respectively and exhibit excellent optical performance of the zoom lens of Table 1.

TABLE 6 f = 6.161–60.200
F/No. = 1.67–2.54

| Lens group | i of i-th surface | r | d | n | ν |
|---|---|---|---|---|---|
| 1 | 1 | 40.480 | 1.00 | 1.80518 | 25.4 |
|  | 2 | 22.263 | 6.50 | 1.58913 | 61.2 |
|  | 3 | −86.385 | 0.15 |  |  |
|  | 4 | 19.537 | 2.50 | 1.60311 | 60.7 |
|  | 5 | 34.061 | Variable |  |  |
| 2 | 6 | 34.061 | 0.70 | 1.77250 | 49.6 |
|  | 7 | 7.704 | 2.81 |  |  |
|  | 8 | −9.296 | 0.70 | 1.77250 | 49.6 |
|  | 9 | 8.159 | 2.50 | 1.84666 | 23.9 |
|  | 10 | −202.944 | Variable |  |  |
| 3 | 11 | 20.149 | 2.80 | 1.51565 | 63.9 |
|  | 12 | −40.032 | Variable |  |  |
| 4 | 13 | −12.289 | 0.70 | 1.84666 | 23.9 |
|  | 14 | −52.539 | 0.15 |  |  |
|  | 15 | 69.448 | 2.40 | 1.51565 | 63.9 |
|  | 16 | −15.345 | 0.15 |  |  |
|  | 17 | 72.398 | 4.40 | 1.51633 | 64.1 |
|  | 18 | −11.254 | Variable |  |  |
| 5 | 19 | ∞ | 20.00 | 1.58913 | 61.2 |
| 6 | 20 | ∞ | 3.80 | 1.51633 | 64.1 |
|  | 21 | ∞ | — |  |  |

Values of a zoom lens according to a second embodiment of the present invention are shown in Table 6 above. Since the lens arrangement of this zoom lens is similar to that of FIG. 1 of the zoom lens according to the first embodiment of the present invention, description thereof is abbreviated for the sake of brevity. In Table 6, the 11th, 12th, 15th and 16th surfaces are aspherical and the conical constant K and the aspherical coefficients D to I of these surfaces are shown in Tables 7(a) and 7(b) below.

TABLE 7(a)

|  | 11th surface | 12th surface |
|---|---|---|
| K | −2.74177E − 1 | 1.78535E + 1 |
| D | −1.31128E − 6 | 6.07434E − 5 |
| E | −7.58237E − 7 | −5.50251E − 7 |
| F | −8.43873E − 9 | 7.86301E − 9 |
| G | 3.01261E − 10 | −4.02727E − 10 |
| H | −1.17026E − 13 | 6.03112E − 12 |
| I | −1.30468E − 13 | −7.14396E − 14 |

TABLE 7(b)

|  | 15th surface | 16th surface |
|---|---|---|
| K | 3.53841E + 1 | −3.74641E + 0 |
| D | 5.16095E − 5 | 1.28704E − 4 |
| E | 1.40187E − 6 | 3.24440E − 6 |
| F | 1.61737E − 9 | 2.36725E − 8 |
| G | 1.78314E − 10 | −4.29119E − 10 |
| H | −1.98764E − 11 | 1.98064E − 13 |
| I | 1.07424E − 13 | −1.25096E − 13 |

Then, as one example of the air space variable by zooming, values of the air space obtained at the time when the object point is disposed at a distance of 2m from the surface r1 of the first lens group 1 are shown in Table 8 below.

TABLE 8

|  | Wide angle | Standard | Telephoto |
|---|---|---|---|
| f | 6.161 | 31.693 | 60.200 |
| d5 | 1.000 | 15.020 | 18.762 |
| d10 | 20.353 | 6.333 | 2.591 |
| d12 | 8.497 | 3.353 | 6.782 |
| d18 | 2.019 | 7.163 | 3.734 |

Figure 6:
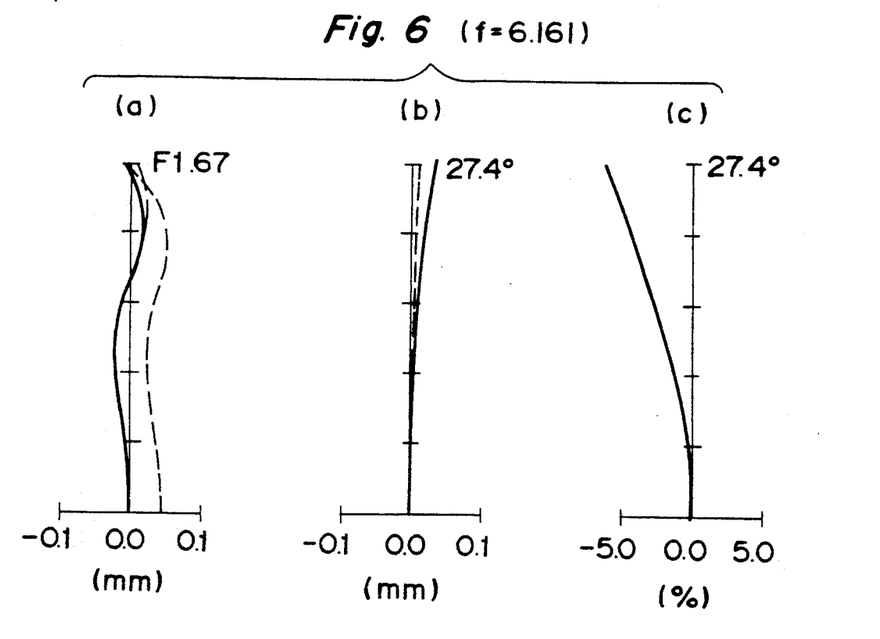
FIGS. 6(a), 6(b) and 6(c) are diagrams showing spherical aberration, astigmatism and distortion at a wide angle end in an aspherical zoom lens according to a second embodiment of the present invention, respectively.
Figure 7:
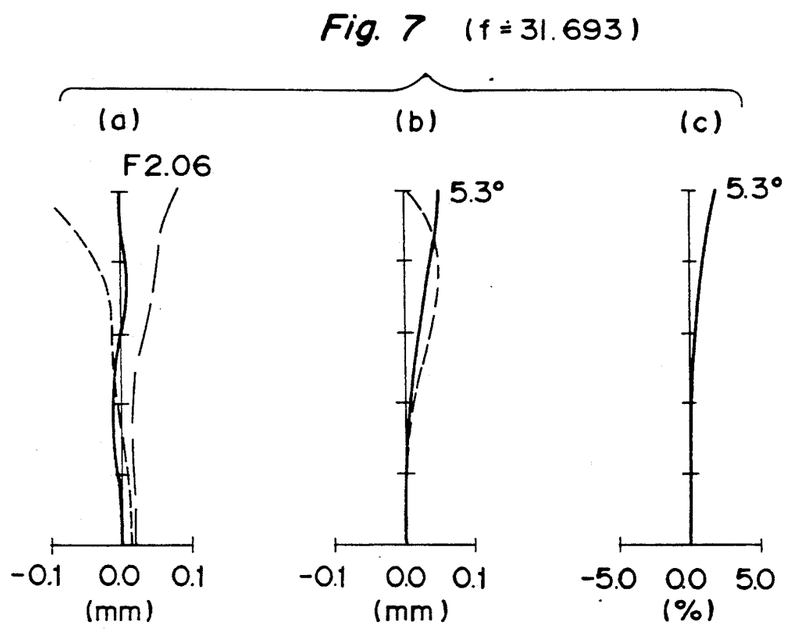
FIGS. 7(a), 7(b) and 7(c) are diagrams showing spherical aberration, astigmatism and distortion at a standard position in the aspherical zoom lens of FIG. 6, respectively.
Figure 8:
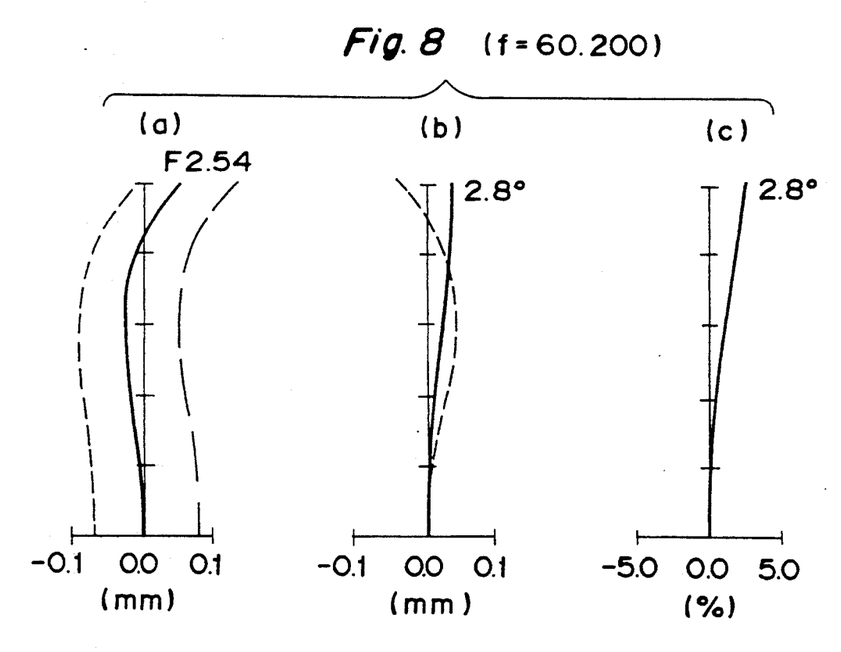
FIGS. 8(a), 8(b) and 8(c) are diagrams showing spherical aberration, astigmatism and distortion at a telephoto end in the aspherical zoom lens of FIG. 6.

FIGS. 6, 7 and 8 show aberrations at the wide angle end, the standard position and the telephoto end of the aspherical zoom lens shown in Table 6, respectively and exhibit excellent optical performance of the zoom lens of Table 6.

Values of a zoom lens according to a third embodiment of the present invention are shown in Table 9 below. Since the lens arrangement of this zoom lens is similar to that of FIG. 1 of the zoom lens according to the first embodiment of the present invention, description thereof is abbreviated for the sake of brevity.

In Table 9, the 11th, 12th and 18th surfaces are aspherical and the conical constant K and the aspherical coefficients D to I of these surfaces are shown in Table 10 below.

TABLE 9 f = 6.179–59.832
F/No. = 1.65–2.49

| Lens group | i of i-th surface | r | d | n | ν |
|---|---|---|---|---|---|
| 1 | 1 | 36.229 | 1.00 | 1.80518 | 25.4 |
|  | 2 | 20.006 | 6.80 | 1.58913 | 61.2 |
|  | 3 | −82.730 | 0.15 |  |  |
|  | 4 | 18.494 | 2.20 | 1.67790 | 55.5 |
|  | 5 | 26.387 | Variable |  |  |
| 2 | 6 | 26.387 | 0.70 | 1.77250 | 49.6 |
|  | 7 | 7.456 | 2.90 |  |  |
|  | 8 | −9.196 | 0.70 | 1.77250 | 49.6 |
|  | 9 | 7.454 | 2.90 | 1.84666 | 23.9 |
|  | 10 | −719.037 | Variable |  |  |
| 3 | 11 | 15.988 | 3.00 | 1.51565 | 63.9 |

TABLE 9-continued $f = 6.179-59.832$
$F/No. = 1.65-2.49$

| Lens group | i of i-th surface | r | d | n | v |
|---|---|---|---|---|---|
| | 12 | −52.336 | Variable | | |
| 4 | 13 | −12.188 | 0.70 | 1.84666 | 23.9 |
| | 14 | −52.923 | 0.15 | | |
| | 15 | 54.800 | 3.00 | 1.51633 | 64.1 |
| | 16 | −14.606 | 0.15 | | |
| | 17 | 29.447 | 3.10 | 1.51565 | 63.9 |
| | 18 | −16.291 | Variable | | |
| 5 | 19 | ∞ | 20.00 | 1.58913 | 61.2 |
| 6 | 20 | ∞ | 3.40 | 1.51633 | 64.1 |
| | 21 | ∞ | — | | |

TABLE 10

| | 11th surface | 12th surface | 18th surface |
|---|---|---|---|
| K | 1.76540E − 0 | −2.32064E + 1 | −6.66270E − 1 |
| D | −1.68283E − 5 | 8.06109E − 5 | 1.14311E − 4 |
| E | −5.27520E − 7 | −4.63027E − 8 | −4.37988E − 8 |
| F | 1.57683E − 8 | 1.72456E − 8 | −3.28207E − 9 |
| G | 1.96428E − 10 | −1.29546E − 10 | 1.69368E − 10 |
| H | −1.27500E − 11 | 2.62129E − 12 | −7.82685E − 13 |
| I | 5.96697E − 14 | −1.39227E − 13 | −2.30831E − 14 |

Then, as one example of the air space variable by zooming, values of the air space obtained at the time when the object point is disposed at a distance of 2m from the surface r1 of the first lens group 1 are shown in Table 11 below.

TABLE 11

| | Wide angle | Standard | Telephoto |
|---|---|---|---|
| f | 6.179 | 31.422 | 59.832 |
| d5 | 1.000 | 14.960 | 18.678 |
| d10 | 20.353 | 6.393 | 2.675 |
| d12 | 8.197 | 3.166 | 6.461 |
| d18 | 2.019 | 7.050 | 3.756 |

Figure 9:
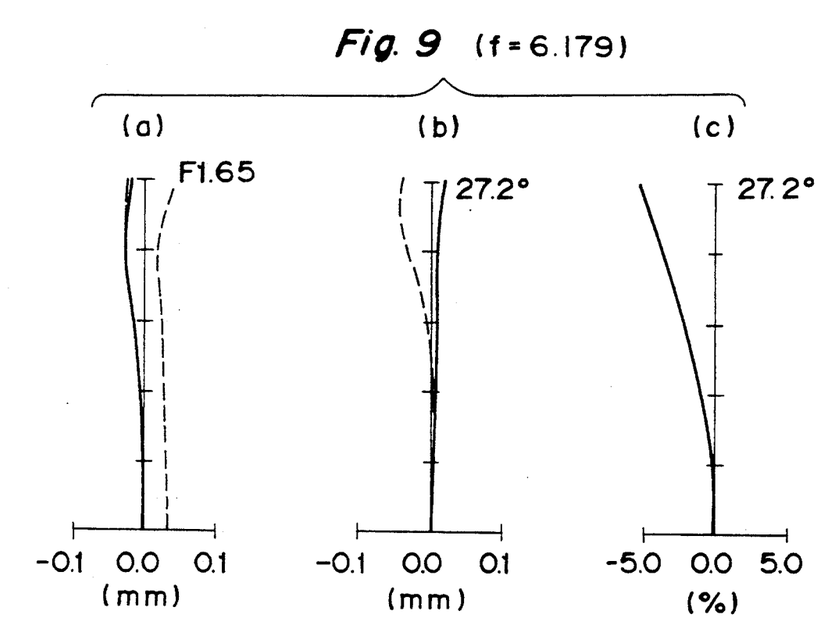
FIGS. 9(a), 9(b) and 9(c) are diagrams showing spherical aberration, astigmatism and distortion at a wide angle end in an aspherical zoom lens according to a third embodiment of the present invention.
Figure 10:
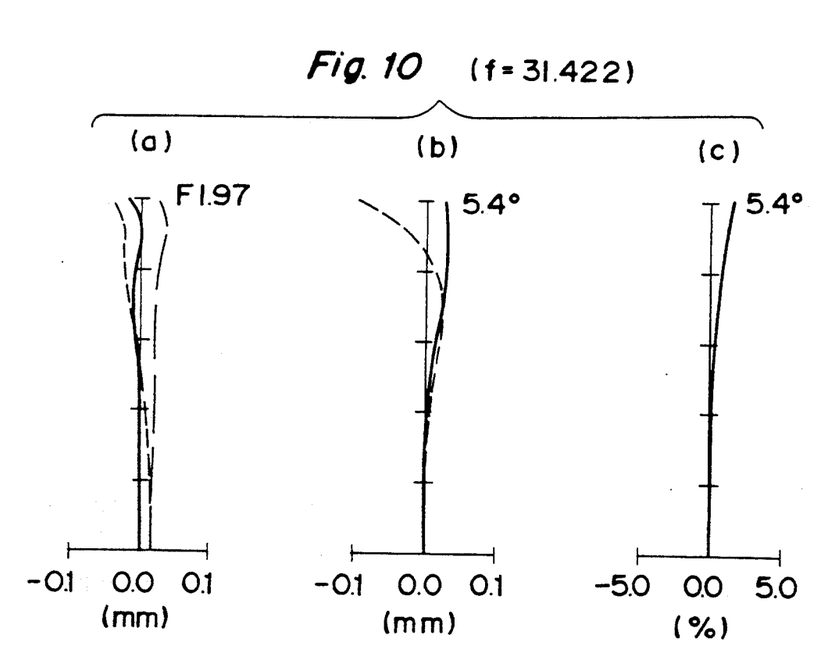
FIGS. 10(a), 10(b) and 10(c) are diagrams showing spherical aberration, astigmatism and distortion at a standard position in the aspherical zoom lens of FIG. 9, respectively.
Figure 11:
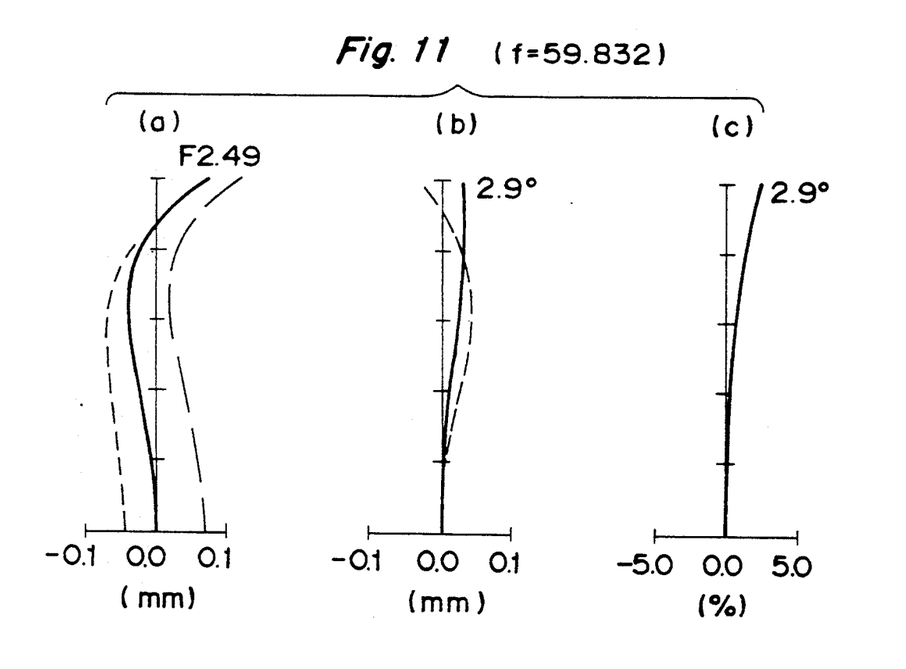
FIGS. 11(a), 11(b) and 11(c) are diagrams showing spherical aberration, astigmatism and distortion at a telephoto end in the aspherical zoom lens of FIG. 9, respectively.

FIGS. 9, 10 and 11 show aberrations at the wide angle end, the standard position and the telephoto end of the zoom lens shown in Table 9, respectively and exhibit excellent optical performance of the zoom lens of Table 9.

Figure 12:
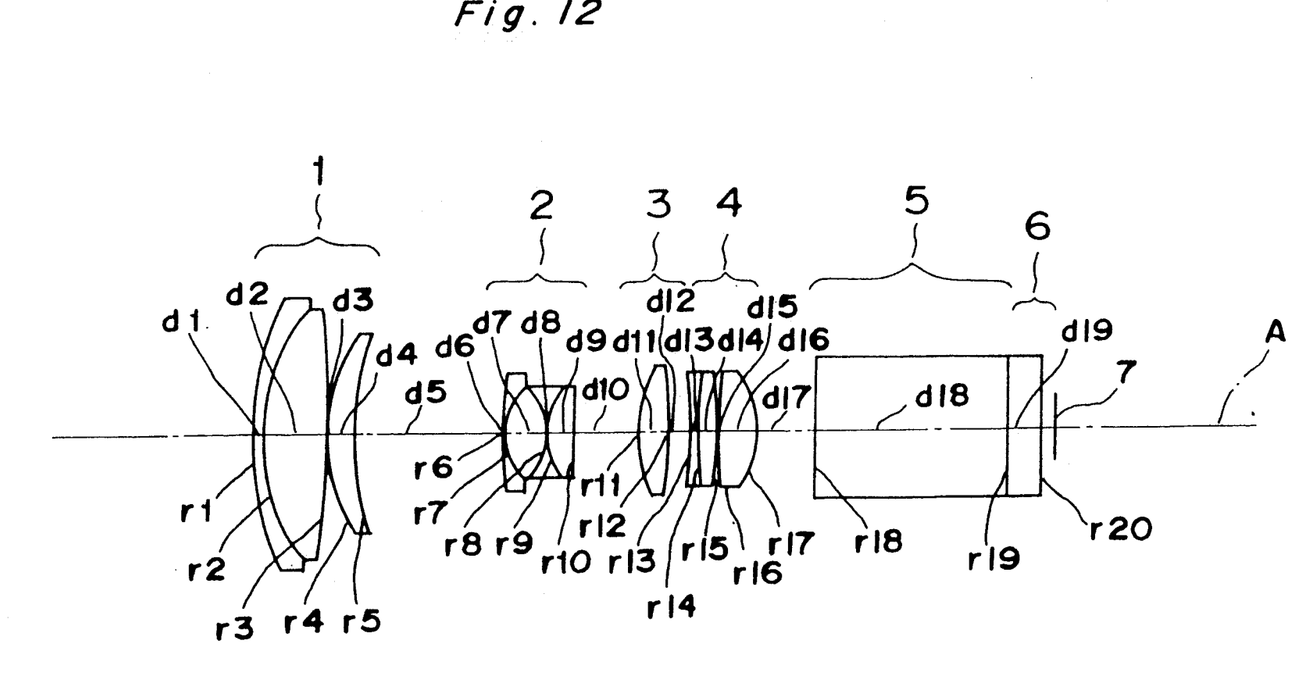
FIG. 12 is a schematic sectional view of an aspherical zoom lens according to a fourth embodiment of the present invention.

Referring to FIG. 12, there is shown a zoom lens according to a fourth embodiment of the present invention. The zoom lens of FIG. 12 is structurally different from that of FIG. 1 in that the concave lens and the first convex lens of the fourth lens group 4 are provided separately from each other in FIG. 1, while the concave lens and the first convex lens of the fourth lens group 4 are formed into a cemented lens in FIG. 12.

Values of the zoom lens of FIG. 12 are shown in Table 12 below.

TABLE 12

$f = 6.178-59.508$
$F/No. = 1.65-2.61$

| Lens group | i of i-th surface | r | d | n | v |
|---|---|---|---|---|---|
| 1 | 1 | 30.698 | 1.00 | 1.80518 | 25.4 |
| | 2 | 18.326 | 6.80 | 1.58913 | 61.2 |
| | 3 | −118.116 | 0.15 | | |
| | 4 | 19.368 | 2.20 | 1.67790 | 55.5 |
| | 5 | 26.218 | Variable | | |
| 2 | 6 | 26.218 | 0.70 | 1.71300 | 53.9 |
| | 7 | 6.844 | 3.14 | | |
| | 8 | −8.916 | 0.70 | 1.72000 | 50.3 |
| | 9 | 6.969 | 2.90 | 1.80518 | 25.4 |
| | 10 | 2360.434 | Variable | | |
| 3 | 11 | 14.290 | 2.80 | 1.51742 | 52.2 |

TABLE 12-continued $f = 6.178-59.508$
$F/No. = 1.65-2.61$

| Lens group | i of i-th surface | r | d | n | v |
|---|---|---|---|---|---|
| | 12 | −51.979 | Variable | | |
| 4 | 13 | −26.348 | 0.70 | 1.84666 | 23.9 |
| | 14 | 41.856 | 1.90 | 1.51633 | 64.1 |
| | 15 | −22.568 | 0.15 | | |
| | 16 | 27.374 | 3.30 | 1.51633 | 64.1 |
| | 17 | −12.318 | Variable | | |
| 5 | 18 | ∞ | 19.00 | 1.60342 | 38.0 |
| 6 | 19 | ∞ | 3.40 | 1.51633 | 64.1 |
| | 20 | ∞ | — | | |

TABLE 13

| | 11th surface | 12th surface | 15th surface |
|---|---|---|---|
| K | 3.47553E − 1 | −6.69985E + 0 | −1.06659E + 1 |
| D | −3.42602E − 5 | 5.95386E − 5 | 6.81479E − 5 |
| E | −2.33104E − 7 | −4.56248E − 7 | 2.34222E − 6 |
| F | −1.74146E − 8 | 7.27684E − 9 | −1.34417E − 8 |
| G | 3.94518E − 10 | −4.92024E − 10 | 3.32563E − 10 |
| H | −1.75791E − 11 | −1.03714E − 11 | −4.48090E − 12 |
| I | −1.40490E − 13 | −8.92761E − 14 | 1.27045E − 13 |

Meanwhile, in Table 12, the 11th, 12th and 15th surfaces are aspherical and the conical constant K and the aspherical coefficients D to I of these surfaces are shown in Table 13 above.

Then, as one example of the air space variable by zooming, values of the air space obtained at the time when the object point is disposed at a distance of 2m from the surface r1 of the first lens group 1 are shown in Table 14 below.

TABLE 14

| | Wide angle | Standard | Telephoto |
|---|---|---|---|
| f | 6.178 | 31.727 | 59.508 |
| d5 | 1.000 | 15.000 | 18.687 |
| d10 | 20.353 | 6.353 | 2.666 |
| d12 | 7.396 | 2.406 | 5.604 |
| d18 | 2.020 | 6.010 | 2.813 |

Figure 13:
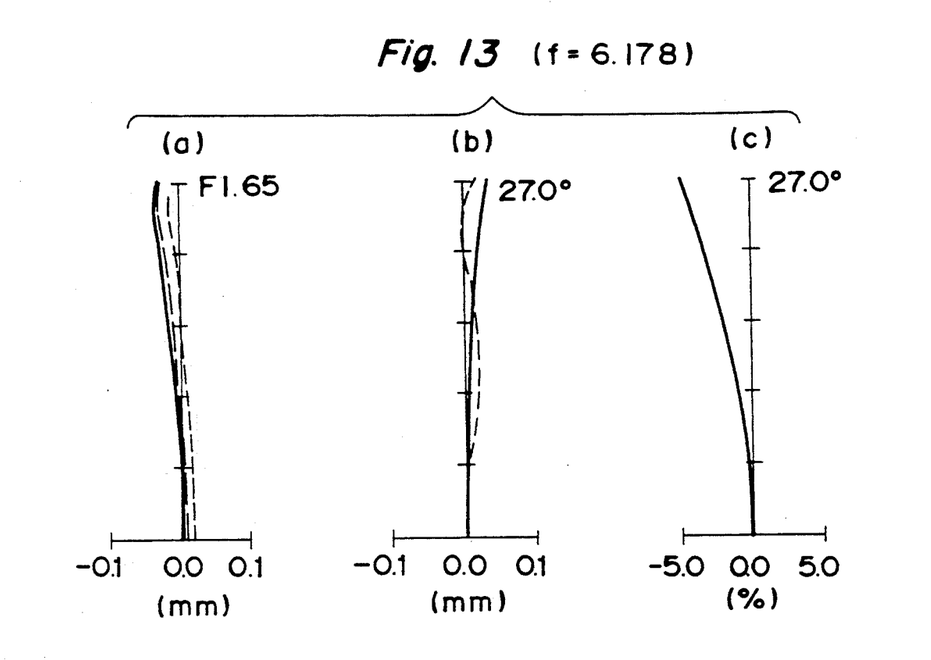
FIGS. 13(a), 13(b) and 13(c) are diagrams showing spherical aberration, astigmatism and distortion at a wide angle end in the aspherical zoom lens of FIG. 12, respectively.
Figure 14:
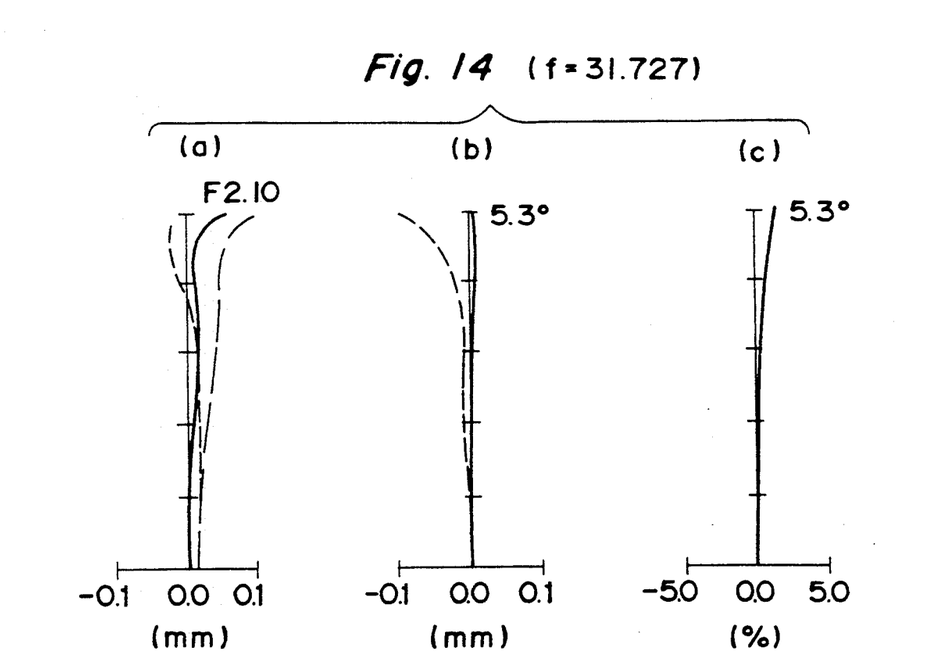
FIGS. 14(a), 14(b) and 14(c) are diagrams showing spherical aberration, astigmatism and distortion at a standard position in the aspherical zoom lens of FIG. 12, FIGS. 15(a), 15(b) are diagrams showing spherical aberration, astigmatism and distortion at a telephoto end in the aspherical zoom lens of FIG. 12.
Figure 15:
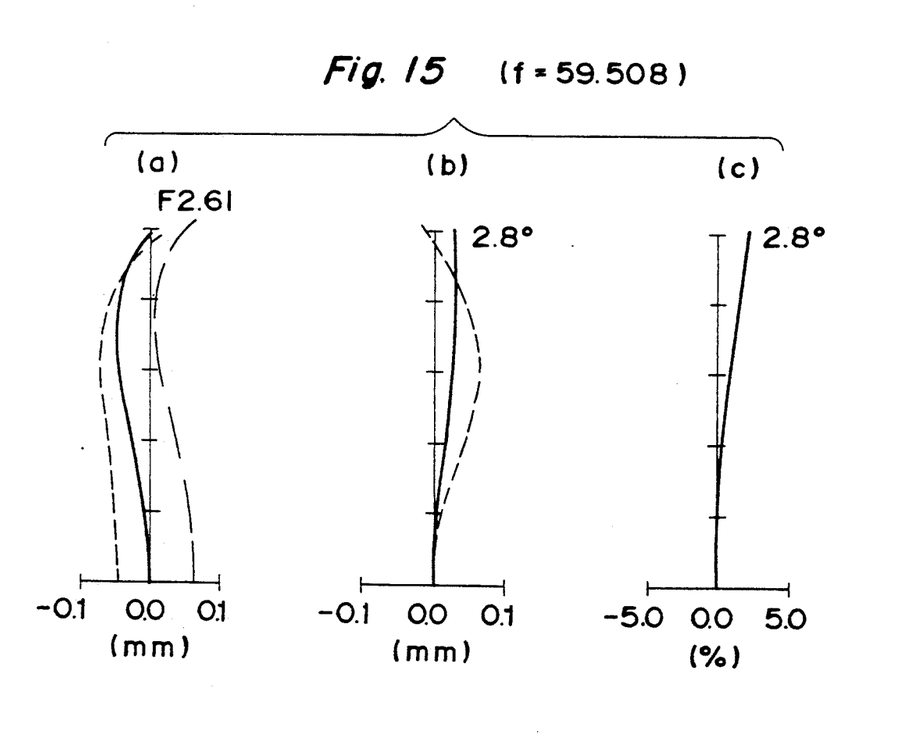

FIGS. 13, 14 and 15 show aberrations at a wide angle end, a standard position and a telephoto end of the zoom lens of FIG. 12 and exhibit excellent optical performance of the zoom lens of FIG. 12.

In the above embodiments, one of the first and second convex lenses of the fourth lens group 4 has one or two aspherical surfaces. However, it is needless to say that the present invention is also applicable to not only a case in which both of the first and second convex lenses of the fourth lens group 4 have aspherical surfaces but a case in which the concave lens of the fourth lens group 4 has at least one aspherical surface.

Figure 16:
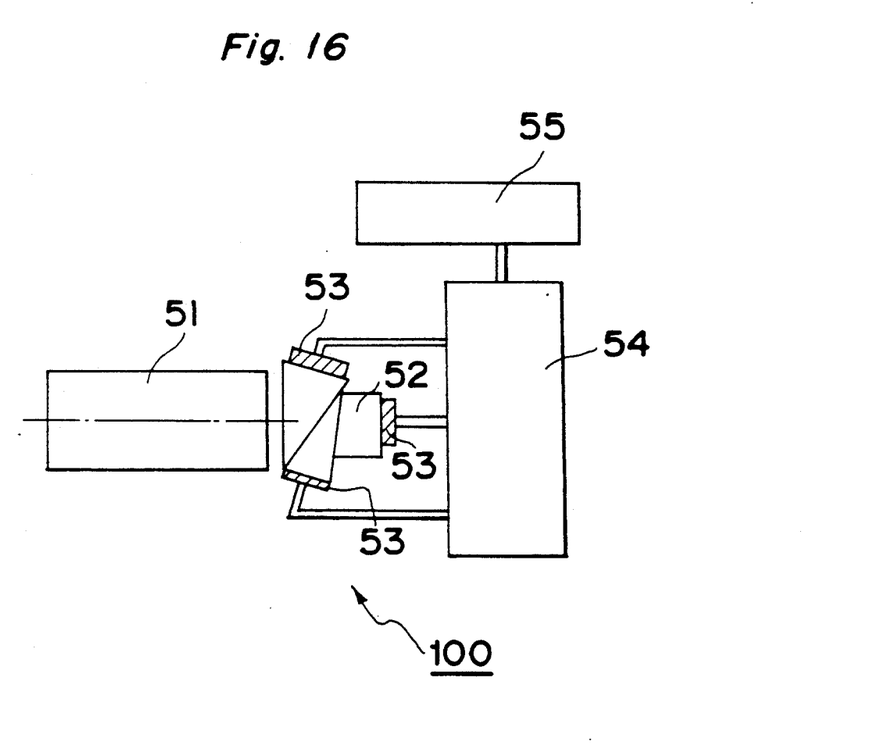
FIG. 16 is a block diagram showing a video camera according to the present invention, which includes the aspherical zoom lens of the present invention.

FIG. 16 shows a 3-CCD type video camera 100 according to the present invention. The video camera 100 includes at least a high-magnification zoom lens 51 of the present invention, an optical system 52 such as a color separation prism, etc., three CCDs 53, a signal processing circuit 54 and a viewfinder 55.

What is claimed is:

1. An aspherical zoom lens comprising sequentially from a side of an object;

a first lens group which has a positive refracting power and is fixed relative to an image surface;

a second lens group which has a negative refrating power and is movable on an optical axis of said aspherical zoom lens so as to have a magnification changing function;

a third lens group which has a positive refracting power and is fixed relative to the image surface so as to have a light converging function; and a fourth lens group which has a positive refracting power and is movable on the optical axis such that the image surface displaceable in response to travel of said second lens group and movement of the object is fixed at a position spaced a predetermined distance from a reference surface;

wherein a relatively large air space is provided between said third and fourth lens group;

wherein when viewed sequentially from the side of the object, said first lens group is constituted by a convex lens, a double convex lens and a meniscus convex lens, said second lens group is constituted by a meniscus convex lens, a double concave lens and a convex lens, said third lens group is constituted by a single lens having at least one aspherical surface and said fourth lens group is constituted by a concave lens and first and second convex lenses at least one of which has at least one aspherical surface.

2. An aspherical zoom lens as claimed in claim 1, wherein said lens of said third lens group has a convex surface confronting the object.

3. An aspherical zoom lens as claimed in claim 1, wherein in said fourth lens group, said concave lens has a concave surface confronting the object and said second convex lens has a convex surface confronting the image surface.

4. An aspherical zoom lens as claimed in claim 1, which satisfies the following conditions (1) to (8):

(1) $3.0 < f1/fW < 8.0$
(2) $0.5 < |f2|/fW < 1.6$
(3) $2.0 < f3/fW < 7.0$
(4) $2.0 < f4/fW < 5.0$
(5) $0.02 < d12/f4 < 1.0$
(6) $0.3 < r11/f3 < 1.5$
(7) $0.3 < |r13|/f4 < 2.0$
(8) $0.3 < |r18|/f4 < 1.5$ where character fW denotes a focal length of said aspherical zoom lens at a wide angle end, character fi (i=1−4) denotes a focal length of an i-th lens group, character d12 denotes the air space between said third and fourth lens groups, character r11 denotes a radius of curvature of one surface of said lens and said third lens group, which surface confronts the object, character r13 denotes a radius of curvature of one surface of said concave lens of said fourth lens group, which surface confronts the object and character r18 denotes a radius of curvature of one surface of said second convex lens of said fourth lens group, which surface confronts the image surface.

5. A video camera including an aspherical zoom lens, an optical system, a plurality of imaging devices, a signal processing circuit and a viewfinder, said aspherical zoom lens comprising sequentially from a side of an object:

a first lens group which has a positive refracting power and is fixed relative to an image surface;

a second lens group which has a negative refracting power and is movable on an optical axis of said aspherical zoom lens so as to have a magnification changing function;

a third lens group which has a positive refracting power and is fixed relative to the image surface so as to have a light converging function; and a fourth lens group which has a positive refracting power and is movable on the optical axis such that the image surface displaceable in response to travel of said second lens group and movement of the object is fixed at a position spaced a predetermined distance from a reference surface;

wherein a relatively large air space is provided between said third and fourth lens groups;

wherein when viewed sequentially from the side of the object, said first lens group is constituted by a convex lens, a double convex lens and a meniscus convex lens, said second lens group is constituted by a meniscus convex lens, a double concave lens and a convex lens, said third lens group is constituted by a single lens having at least one aspherical surface and said fourth lens group is constituted by a concave lens and first and second convex lenses at least one of which has at least one aspherical surface;

wherein said aspherical zoom lens satisfies the following conditions (1) to (8):

(1) $3.0 < f1/fW < 8.0$
(2) $0.5 < |f2|/fW < 1.6$
(3) $2.0 < f3/fW < 7.0$
(4) $2.0 < f4/fW < 5.0$
(5) $0.02 < d12/f4 < 1.0$
(6) $0.3 < r11/f3 < 1.5$
(7) $0.3 < |r13|/f4 < 2.0$
(8) $0.3 < |r18|/f4 < 1.5$ wherein character fW denotes a focal length of said aspherical zoom lens at a wide angle end, character fi (i=1−4) denotes a focal length of an i-th lens group, character d12 denotes the air space between said third and fourth lens groups, character r11 denotes a radius of curvature of one surface of said lens of said third lens group, which surface confronts the object, character r13 denotes a radius of curvature of one surface of said concave lens of said fourth lens group, which surface confronts the object and character r18 denotes a radius of curvature of one surface of said second convex lens of said fourth lens group, which surface confronts the image surface.

* * * * *